Sept. 21, 1954  H. M. DUNN ET AL  2,689,577
APPARATUS FOR WASHING VEHICLES
Filed June 12, 1951  3 Sheets-Sheet 1

Inventors
Henry M. Dunn
David Oles
By Earle & Steward
Attorneys

Sept. 21, 1954  H. M. DUNN ET AL  2,689,577
APPARATUS FOR WASHING VEHICLES
Filed June 12, 1951  3 Sheets-Sheet 2
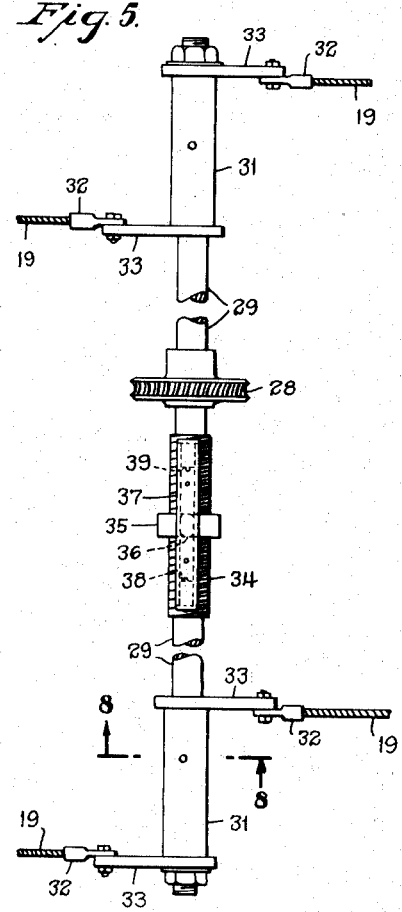
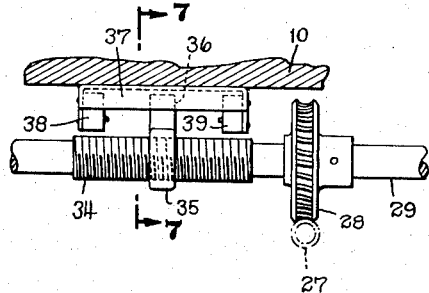
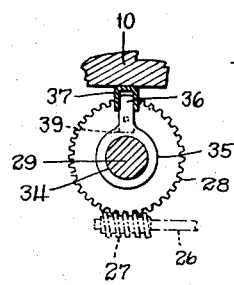
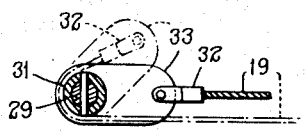
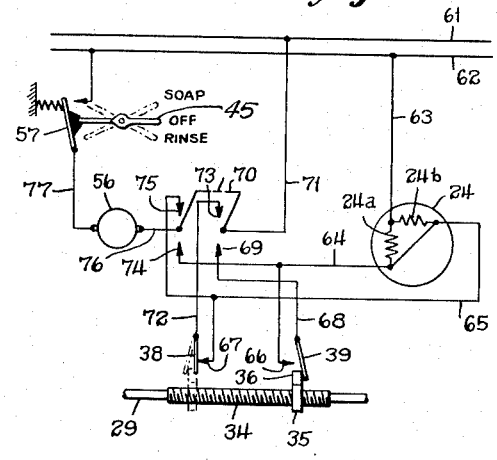
Inventors
Henry M. Dunn
David Oles
By Earle Stumd
Attorneys Sept. 21, 1954      H. M. DUNN ET AL      2,689,577
APPARATUS FOR WASHING VEHICLES
Filed June 12, 1951      3 Sheets-Sheet 3
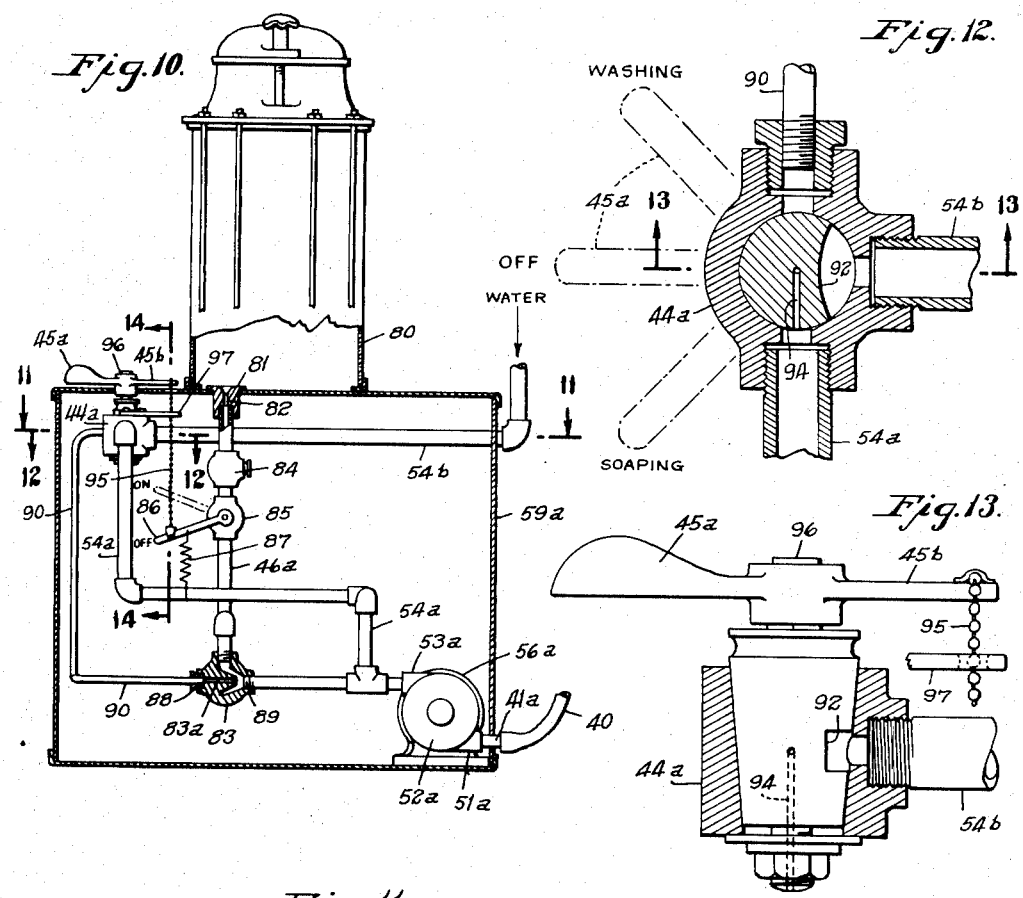
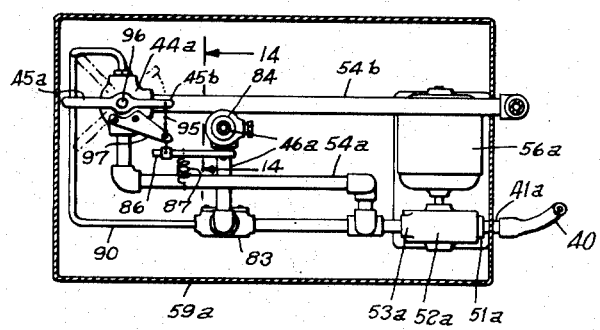
Inventors
Henry M. Dunn
David Oles
By Earle T. Steenal
Attorneys Patented Sept. 21, 1954

2,689,577

UNITED STATES PATENT OFFICE 2,689,577

APPARATUS FOR WASHING VEHICLES

Henry M. Dunn and David Oles, New Haven, Conn., assignors to Choldun Manufacturing Corporation, New Haven, Conn., a corporation of Connecticut Application June 12, 1951, Serial No. 231,238

13 Claims. (Cl. 134—123)

The present invention relates in general to apparatus for washing vehicles and, in particular, to improved apparatus for spraying an automobile or similar vehicle with water and detergents.

An object of the invention is to provide improved vehicle-washing apparatus which may be operated automatically for spraying wash water and detergents over a vehicle.

A further object of the invention is to provide improved vehicle-washing apparatus which is of inexpensive, durable and dependable construction; which may be installed in a minimum of space; and which may be moved automatically to and from position for washing a vehicle.

A further object of the invention is to provide an improved vehicle-washing apparatus of the type described, which occupies no floor space and is operable independently of tracks, guides or a skeleton frame.

A still further object of the invention is to provide an improved car-washing apparatus characterized by spraying-means supported by overhead reel mechanism and adapted to be automatically lowered and raised into and from operating position with respect to a vehicle to be washed.

A still further object of the invention is to provide car-washing apparatus of the type hereinabove described wherein simplified control-means is provided for automatically moving the spraying-means of the apparatus relative to the vehicle being washed, and for simultaneously supplying liquid to the spraying-means.

A still further object of the invention is to provide car-washing apparatus of the type hereinabove described embodying simplified control-means which includes shutoff-means for automatically stopping the reel mechanism of the apparatus at the end of each complete soaping or rinsing cycle, and reversing-means for automatically reversing the direction of movement of the spraying-means of the reel mechanism at the end of each half cycle.

A still further object of the invention is to provide car-washing apparatus of the type hereinabove described, having fluid-supply means of simple, economical and dependable construction for selectively delivering water, and a mixture of water and detergent, to a car-washing apparatus.

A still further object of the invention is to provide car-washing apparatus of the type hereinabove described, embodying simplified control-means for controlling the operation both of the fluid-supply means and the spraying-means of the apparatus.

A still further object of the invention is to provide a car-washing apparatus of the type hereinabove described, wherein the fluid-supply means is provided for supplying clear water to the spraying-means of the apparatus, or a mixture of water and a detergent, the mixing of the water and detergent being accomplished by a valve-means.

Other objects and advantages will appear to those skilled in the art from the following, considered in conjunction with the accompanying drawings.

In the accompanying drawings, in which certain modes of carrying out the present invention are shown for illustrative purposes:

Fig. 5 is an enlarged broken top plan view of the reel mechanism for automatically raising and lowering the pipeline spraying-means, including fragmentary ends of the cables connected thereto;

Fig. 6 is a fragmentary front elevation of the reel mechanism of Fig. 5 showing details of the automatic shutoff-means for controlling the operation of the reel mechanism;

Fig. 7 is a transverse section of the reel mechanism on line 7—7 of Fig. 6;

Fig. 8 is a transverse section of the reel mechanism on line 8—8 of Fig. 5 showing the pivoted link for connecting one end of a cable to the crank-arm of the corresponding spool;

Fig. 9 is a diagram of the electrical circuit for automatically controlling the operation of the apparatus;

Fig. 10 is a side elevation partly in section of a modification of the fluid-supply means of the pipeline spraying means;

Fig. 11 is a transverse sectional view of the fluid-supply means taken on line 11—11 of Fig. 10;

Fig. 12 is an enlarged sectional view of the fluid-supply means taken on line 12—12 of Fig. 10;

Fig. 13 is a vertical section of the three-way plug-valve used in the fluid-supply means and taken on line 13—13 of Fig. 12; and Fig. 14 is a broken side elevation of the three-way plug-valve on section line 14—14 of Fig. 11.

Figure 1:
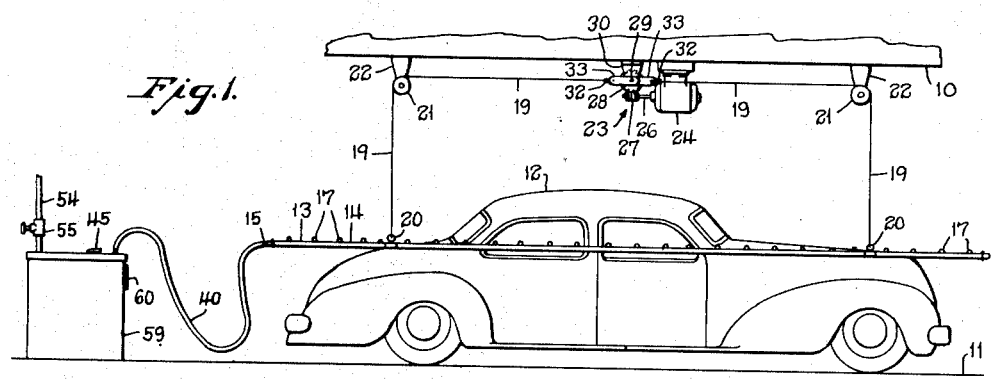
Fig. 1 is a side elevation of the improved vehicle-washing apparatus of this invention showing the spraying-means of the apparatus lowered into a position for washing a vehicle.

In general, the improved car-washing apparatus of this invention is adapted for overhead installation and embodies spraying-means in the form of a closed pipeline circuit arranged to encircle a portion of a vehicle to be washed, the pipeline spraying-means being adapted to be automatically lowered and raised relative to the vehicle.

The showing of Figs. 1 to 9 inclusive

Referring to the drawings, the numeral 10 designates an overhead supporting-means for the improved vehicle-washing apparatus of this invention and may be the ceiling of a garage, service station or other enclosure within which the vehicle is to be washed, the overhead supporting-means 10 being, in any event, spaced vertically above the floor 11 or other supporting-surface of a vehicle 12 sufficiently distant to enable the vehicle to be run onto the floor beneath the ceiling 10. The improved vehicle-washing apparatus includes spraying-means which, in the embodiment shown, comprises a substantially-rectangular frame 13 consisting of lengths of pipe 14 or tubular stock secured together in any suitable manner to form a closed pipeline circuit or frame, the overall dimensions of the substantially-rectangular pipeline-frame 13 being such that the latter may completely encircle the vehicle 12. Intersecting one of the pipes 14 of the pipeline-frame and preferably the pipe at one end thereof, is a T-fitting 15 which provides an inlet-port for the pipeline-frame 13 as and for the purpose hereinafter described. Moreover, each of the pipes 14 of the frame is provided on its top wall with a plurality of longitudinally-spaced apertures 16 in which elbows 17 are screw threaded, each elbow being arranged with its upper open end facing inwardly of the frame and provided with a spray-nozzle 18 as shown especially well in Fig. 4. It will be understood that the spray-nozzle 18 is illustrative only of a suitable nozzle for the pipeline-frame and that other types of spray-nozzles may be used if desired. Moreover, while the pipeline-frame 13 shown herein is substantially rectangular, it will be understood that the frame may be made circular, elliptical, oval, or of other geometrical shapes.

The pipeline-frame 13 is designed to be suspended from the overhead supporting-means 10 so as to leave the floor area 11 unobstructed for driving a vehicle onto the floor 11 beneath the pipeline-frame for washing. To these ends, the pipeline-frame 13 is provided with a set of four flexible cables 19, each secured at one end to an upstanding eye 20 fixedly secured to one of the long sides of the pipeline-frame adjacent one end thereof, as illustrated especially well in Fig. 1. The opposite end of each cable 19 is passed over a pulley 21 secured by a bracket 22 to the ceiling 10 substantially immediately above the corresponding eye 20 of the pipeline-frame and is carried from its respective pulley below and in substantially parallel relationship to the ceiling, to a spool of a motor-driven reel mechanism indicated generally at 23.

Figure 2:
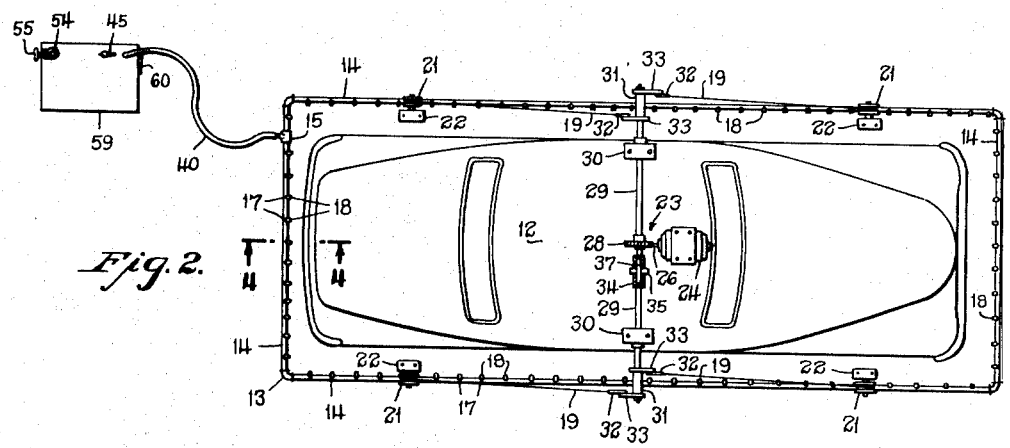
Fig. 2 is a top plan view of the apparatus shown in Fig. 1.

The reel mechanism 23 is supported on the ceiling 10 substantially intermediate the forward and rearward pairs of pulleys 21—21 and on an axis substantially at right angles to the longitudinal axis of the pipeline-frame. Referring especially to Fig. 2, the reel mechanism embodies a reversible motor 24 secured to the ceiling and energized by a power-supply circuit hereinafter described. The shaft 26 of the motor is provided with a worm 27 which is in engagement with a worm-gear 28 keyed to a reel-shaft 29 substantially intermediate its opposite ends, the reel-shaft 29 being, in turn, rotatably supported adjacent its opposite ends by brackets 30 secured to the ceiling. Fixedly secured to each outer free end of the reel-shaft 29 is a spool 31 around which the cables 19—19 on the corresponding side of the pipeline-frame 13 are adapted to be wrapped. Referring especially to Figs. 5 and 8, it will be seen that the spool-end of each cable is not connected directly to its respective spool, but is connected to the outer end of a reversing-link 32, the inner end of which is pivotally secured to the outer end of a crank-arm 33 welded or otherwise secured at its opposite or inner end to the adjacent end of the cable-spool 31. The two crank-arms 33—33 of each spool 31 are welded to the opposite ends thereof respectively so as to project substantially transversely of its longitudinal axis in opposite directions and at an angular relationship of substantially 180°. This construction, and in particular the pivoted links 32—32, constitute reversing-means for automatically returning the pipeline-frame from its lowermost position with respect to the vehicle, to its normal uppermost position, without reversing the direction of rotation of the motor and associated drive-means of the reel mechanism. It will be seen that by selecting the lengths of the cables 19 such that the cables will be completely unwound from their respective spools 31, in the manner shown in Fig. 5, when the frame is at its lowermost or half-cycle position, continued rotation of the shaft 29 in the same direction will, due to the pivotal action of the reversing-links 32 relative to their respective crank-arms 33, cause the respective cables to be rewound on the corresponding spool 31, but from the opposite side thereof, as shown especially well in Fig. 8, the pivoted reversing-links 32 serving to reverse the direction in which the respective cables are rewound on the spool. Thus, as the motor 24 of the reel mechanism rotates the pair of spools 31—31 continuously and in one direction, the pipeline-frame moves through one complete cycle from its uppermost position to its lowermost position and return, the reversal in the direction of movement of the frame being effected automatically at the end of the half cycle by the reversing-links of the spools.

In addition to the spool and crank assemblies of the reel mechanism, the shaft 29 carries automatic stop-means for controlling the operation of the reel mechanism, said automatic stop-means comprising an externally-threaded sleeve 34 which, as shown in Fig. 6, is secured to the shaft 29 of the reel mechanism adjacent its worm wheel 28. Mounted on the sleeve 34 is a traveling nut 35 which is provided with an integral upstanding finger 36, the upper end of which is adapted to be engaged between the depending substantially spaced-parallel side walls of a channel-guide member, indicated generally at 37. The latter is adapted to be secured to the ceiling 10 in substantially-axial alignment with the shaft 29 and immediately above the externally-threaded sleeve 34 thereof, the length of the channel-guide member 37 corresponding substantially to the length of the externally-threaded sleeve 34. Fixedly secured at the opposite ends, respectively, of the channel-guide member 37 are snap-switches 38 and 39, respectively, the actuating-buttons of which project inwardly toward opposite sides respectively of the traveling finger 36 of the nut 35. Thus, upon rotation of the shaft 29 and its sleeve 34 in one direction, the nut 35 is made to travel longitudinally of the externally-threaded sleeve 34 until the upstanding finger 36 of the nut is brought into engagement with a snap-switch actuating-button at one end of the channel-guide member to open the switch. Thereupon, the circuit to the motor is broken and the motor deenergized for discontinuing the rotation of the shaft in this direction. Thereafter, by operating a double-pole double-throw switch hereinafter described, the motor may be re-energized, but in this case so as to cause the motor to be rotated in the reverse direction, thereby reversing the direction of rotation of the shaft 29 and causing the nut 35 to travel in the opposite direction on the externally-threaded sleeve 34 until the upstanding finger of the nut is brought into engagement with the switch-operating button of the snap-switch at the opposite end of the channel-guide member. When this snap-switch is opened, the circuit to the reversible motor is again broken and the rotation of the shaft stopped.

In accordance with the novel features of the invention, the length of travel of the nut 35 along the externally-threaded sleeve 34 between the snap-switches 38 and 39 is commensurate with the movement of the pipeline-frame through one complete washing cycle, that is to say, the pipeline-frame moves downwardly from its uppermost inoperative position adjacent the ceiling to its lowermost position with respect to the vehicle and back again to its uppermost inoperative position adjacent the ceiling, the arrival of the pipeline-frame in its uppermost position coinciding with the engagement of the traveling nut 35 with the snap-switch at one end of the externally-threaded sleeve for shutting off the motor.

The circuit diagram for illustrating the above-described operation of the reel mechanism and pipeline-frame is shown in Fig. 9 and will be described below in connection with the operation of the apparatus.

*Fluid supply-means*

Figure 3:
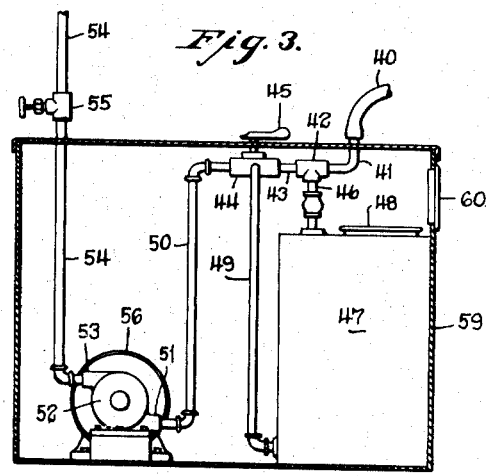
Fig. 3 is an enlarged side elevation partly in section of the fluid supply-means of the vehicle-washing apparatus.
Figure 4:
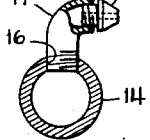
Fig. 4 is an enlarged section on line 4—4 of Fig. 2 showing a detail of the pipeline spraying-means of the apparatus.

The pipeline-frame 13 is adapted to be provided with water and a detergent for washing a vehicle, and to this end the T-fitting 15 of the frame is connected by a flexible tube 40 to a fluid-supply means which is adapted to deliver water and/or a detergent selectively to the spray-nozzles of the pipeline-frame 13. Referring especially to Fig. 3, the fluid-supply means, comprises a feed-pipe 41, secured in one side of a T-fitting 42, the opposite side of which is connected by a short length of pipe 43 to a three-way valve 44 which is operated by a manually-operated valve-handle 45. The vertical opening in the bottom of the T-fitting 42 is connected by a pipe 46 into the top of a tank 47 which contains a liquid soap solution, detergent, or similar material, the tank 47 being provided with a filling-opening in the top thereof having a cover 48. The aforesaid three-way valve 44 is also connected by a pipe 49 to the soap tank 47 at a point adjacent the bottom thereof, as shown in Fig. 3. A third pipe 50 connects a third port of the three-way valve 44 to the outlet-port 51 of a third supply-means or water pump 52 for supplying water under pressure to the pipeline-frame 13. In this connection, the inlet-port 53 of the pump 52 is connected to a water-supply pipe 54 having a shutoff-valve 55 at its upper end whereby water is supplied to the pump. The operation of the pump for delivering the water under pressure to the pipeline-frame and detergent tank 47 is effected by means of an electric motor 56 connected to the shaft of the pump, the motor 56 being automatically energized each time the motor 24 of the reel mechanism is energized, as indicated in the circuit diagram of Fig. 9.

Referring again to the three-way valve 44, the latter provides a single manually-operated control-means for regulating the flow of water and detergent to the pipeline-frame 13. Thus, one setting of the valve-handle 45, hereinafter referred to as its "off" position, shuts off the water-feed pipe 50 from the pipes 43 and 49, thus preventing water from flowing either to the pipeline-frame 13 or to the soap tank 47. A second setting of the manually-operated handle 45 of the three-way valve, hereinafter referred to as its "rinse" position, is adapted to shut off the pipe 49 from the water pipe 50 and pipe 46 so as to permit water to flow directly from the water pump 52 by way of the pipe 50, pipe 43, T-fitting 42, feed-pipe 41 and tube 40, to the pipeline-frame 13 for supplying clear rinse water to the spray-nozzles 18 of the frame. A third setting of the valve-handle 45 is adapted to divert the water under pressure from the water pump by way of the pipe 49 into the soap tank 47, and is hereinafter referred to as the "soap" position of the valve-handle, the flow of water under pressure through the soap tank 47 serving to mix the water and soap, which mixture or solution is then forced up out of the soap tank 47 by way of the pipe 46, T-fitting 42, feed-pipe 41, and flexible tube 40 to the nozzles 18 of the pipeline-frame 13. As a precaution against inadvertently starting the motor-operated water pump while the valve-handle 45 is in its "off" position, that is to say, when the water pipe 50 is shut off, a safety trigger-switch 57 is connected in one of the leads from the motor to the power-supply lines, the trigger-switch being mechanically operatively connected to the manually-operated valve-handle 45 in the manner shown, the arrangement of the above-described parts being such that whenever the valve-handle 45 is in its "off" position, the safety trigger-switch 57 will be opened automatically to break the circuit of the pump-motor and hence prevent energization thereof, even though the double-pole double-throw switch of the operating circuit is closed.

In the preferred construction shown, the water pump and motor and the soap tank and interconnecting pipes are enclosed by a sheet metal casing 59 to form a single unit capable of being readily transported, one wall of the casing being provided with a door 60, or the equivalent, to give access to the cover 48 of the soap tank for filling the latter.

The automatic operation of the car-washing apparatus is controlled by means of the electric circuit shown in Fig. 9 wherein a source of electrical energy is indicated by the two conductors 61 and 62, the conductor 62 being connected to the reversible motor 24 by the line 63. The two windings for reversing the direction of rotation of the motor 24 are indicated at 24a and 24b, respectively, and are connected by lines 64 and 65, respectively, to terminals 66 and 67 of the aforesaid snap-switches 39 and 38 respectively, each of which is adapted normally to be closed, but to be momentarily opened when engaged by the traveling nut 35, as hereinabove described. The second terminal of the snap-switch 39 is connected by a line 68 to the pole 69 of a double-pole double-throw manually-operated switch which is indicated at 70, one arm of which is connected by a line 71 to the conductor 61. The second terminal of the snap-switch 38 is connected by a line 72 to a pole 73 substantially opposite the pole 69 of the double-throw switch 70. Extensions of the lines 64 and 65 terminate in oppositely-disposed poles 74 and 75, respectively, of the double-pole switch 70, the second arm of which is connected by a line 76 to one side of the pump-motor 56, the opposite side of which is connected to the conductor 62 by a line 77 in which is inserted the trigger-switch 57.

The operation of the apparatus may be described briefly as follows. Assuming that the pipeline-frame 13 is in its normal raised position adjacent the ceiling and that a vehicle has been driven onto the floor of the garage or similar enclosure beneath the pipeline-frame 13, the operator of the apparatus then turns the valve-operating handle 45 to its "soap" position so that water under pressure will be diverted through the detergent tank 47 for supplying a solution of water and soap, or the equivalent, to the nozzles of the pipeline-frame. It will be noted that upon turning the manually-operated valve-handle 45 from its neutral or "off" position, it automatically releases the trigger-switch 57 which closes the circuit through the line 77 of the water-pump operating-motor 56. Thereupon, the operator throws the double-pole double-throw switch 70 to close one of its two sets of poles for energizing the water-pump motor 56 and the motor 24 of the reel mechanism. Let it be assumed further that the traveling-nut 35 is at the right-hand end of the externally-threaded sleeve 34 of the reel-shaft 29 in engagement with and holding open the snap-switch 39, as shown in Fig. 9. Now, if the double-pole double-throw switch 70 is pulled down, as seen in Fig. 9, in a direction to close the circuit from the conductor 61 through the poles 69 and 74 to the motors, neither motor will be energized since the snap-switch 39 is open and hence no current will flow through the lead 64 or its extension. Consequently, the apparatus will not be put into operation. Realizing this, the operator will then throw the double-throw switch 70 in the opposite direction to engage its opposite poles 73 and 75. Since the snap-switch 38 is closed, current will flow from the conductor 61 through the snap-switch 38 to the lead 65 and energize the winding 24b of the motor; and to the terminal pole 75 which is now connected to the pump-motor line 76. Hence, both motors are put into operation substantially simultaneously, thereby causing the traveling nut 35 to move toward the left-hand end of the sleeve 34 and the water-pump to pump water from the water-supply pipe 54 through the pipes 59 and 49, into the detergent tank 47, and from thence by way of the pipes 46, 41 and 40 to the pipeline-frame from the nozzles of which the soapy solution is sprayed over the vehicle to be washed. As soon as the traveling nut 35 moves away from the snap-switch 39, the latter automatically closes, but inasmuch as the circuit from the pole 69 to the lead 64 is open, the winding 24a is not energized and the motor 24 continues to rotate in one direction. During this time, the cables of the frame are being unwound from the respective spools at opposite ends of the rotating shaft 29 to lower the pipeline-frame relative to the vehicle. When the cables have been completely unwound from the spools, the frame is at its half-cycle or lowest position with respect to the vehicle and the traveling nut 35 is substantially halfway between the two snap-switches 38 and 39. Hence, unless the operator throws the switch 70 to close its opposite poles, there is no change in the direction of rotation of the motor-driven shaft 29, nor the spools at the opposite ends thereof. However, due to the pivotal action of the reversing-links 32 at the ends of the crank-arms 33 of the spools 31, continued rotation of the spools in the direction indicated will carry the respective cables over onto the opposite sides of the spools, whereupon the cables are rewound thereon in the opposite direction. Thus, the direction of movement of the pipeline-frame 13 is reversed, that is to say, the pipeline-frame 13 is carried upwardly with respect to the vehicle, this upward movement of the frame continuing until it is again in its uppermost position immediately adjacent the ceiling. With the arrival of the frame in this position, the traveling-nut 35 engages the left-hand snap-switch 38 and opens the circuit to the winding 24b of the motor 24, thereby de-energizing the latter. Simultaneously, the circuit of the water-pump motor 56 is opened and the soapy solution ceases to be sprayed from the nozzles of the frame.

Having soaped the vehicle, the operator then proceeds to rinse off the soap and dirt from the vehicle, and to this end the operator turns the valve-handle 45 from its "soap" position to its "rinse" position, whereby the passage of water through the detergent tank 47 is cut off and water will be pumped by the motor-operated water pump directly to the pipeline-frame 13. With the valve-handle 45 in its "rinse" position, the trigger-switch 57 is closed. The operator then operates the double-pole double-throw switch 70 to close the circuit from the conductor 61 through the poles 69 and 74 of the switch 70 to the snap-switch 39 which, at this time, is closed. The circuit to the motor-winding 24a of the reversible motor 24 is thus energized and the motor is made to rotate in a direction opposite to its previous direction of rotation. Simultaneously, the terminal pole 74 is connected to the pump-motor line 76 to start the latter. The traveling-nut 35 now moves from its left-hand position as seen in Fig. 9, toward its right-hand position, the movement of the traveling-nut 35 away from the snap-switch 38 permitting the latter to close. However, since its line 72 is connected to the open terminal pole 73 of the double-throw switch 70, the circuit through the winding 24b of the motor 24 is dead and the motor continues to rotate in the direction described. As in the previous sequence of operations, the frame moves downwardly over the vehicle spraying the latter with clean water, so as to rinse off the soap solution, and at the end of its lowermost travel the direction of movement of the frame is automatically reversed by the reversing-links of the spools and the frame is carried up to its uppermost position adjacent the ceiling. Simultaneously, the traveling-nut 35 engages the right-hand snap-switch 39 and opens the circuit to the reel-operating motor 24, whereby the latter and the motor 56 of the water pump are deenergized and the apparatus is again completely shut off.

Although the foregoing description may be said to be the normal operation of the car-washing apparatus, it will be evident that the apparatus is so designed that it is not necessary to follow this specific sequence of operations. Thus, since the snap-switches 38 and 39, respectively, are automatically closed as soon as the traveling-nut 35 moves out of engagement therewith, it is possible for an operator to throw the double-pole double-throw switch 70 manually from one set of terminal poles to the other, for effecting a reversal in the direction of rotation of the motor 24. Thus, the frame may be lowered to a point substantially intermediate its uppermost and lowermost positions, whereupon by reversing the double-pole double-throw switch 70, the direction of rotation of the motor 24 would be reversed and the frame again raised into its upper position. There is thus complete flexibility in the operation of the pipeline-frame to meet any contingencies or circumstances that may arise in car washing operations.

The showing of Figs. 10 to 14 inclusive

A modification of the hereinabove described fluid-supply means of the pipeline-frame is shown in Figs. 10 through 14, and in general functions to supply water and a detergent selectively to the pipeline-frame. However, in this form of the invention, the fluid-supply means is designed to feed the detergent to the pipeline-frame by suction from the detergent tank instead of by forcing water under pressure through the detergent tank in the manner characteristic of the apparatus shown in Fig. 3.

Referring to Fig. 10, the fluid-supply means comprises a feed-pipe 41a connected at its outlet end by a flexible tube 40 to the pipeline-frame and at its opposite end directly to the outlet port 51a of the motor-driven water pump 52a. The inlet port 53a of the pump is provided with a T-fitting, the vertical opening of which is connected to the lower end of a water-supply pipe 54a, the upper end of which is connected into a radial port of a manually operated three-way valve 44a. Water is supplied to the latter by a water-supply pipe 54b which is connected at its inner end to a second radial port of the three-way valve. The opposite end of the water-supply pipe 54b extends outwardly of a sheet-metal casing 59a which houses and supports the elements of the fluid-supply means. In this connection, it will be noted that the detergent supply-tank is in this instance a glass cylinder 80 supported in an upright position on the top of the sheet-metal casing 59a and forming a fluid-tight seal therewith, the top of the glass cylinder being closed by a removable cover. This type of tank affords visual inspection of the soap supply, facilitates cleaning and replenishing the tank and resists the corrosive effects of the soap. For a more complete description of the structural details of the glass detergent supply-tank, reference may be had to our co-pending application, Serial No. 137,422.

The outlet in the bottom of the detergent supply-tank is indicated by the numeral 81 and is designed to control the rate of flow of the detergent from the tank, and to this end is provided with a restricted aperture 82 through which only a limited quantity of detergent may be drawn for a given vacuum pulled on the supply-tank by the vacuum-creating means hereinafter described. A detergent supply-pipe 46a is connected at its upper end to the outlet 81 in the bottom of the detergent supply-tank and at its lower end in a vertical aperture of a mono-flow valve indicated by the numeral 83. A characteristic feature of this type of valve is an internal venturi passage 83a which serves to create a partial vacuum in the valve by the flow of water through the venturi passage. Fastened in the detergent supply-pipe 46a between its upper and lower ends, is a check valve 84 and a cutoff valve 85, the check valve 84 being mounted in the detergent supply-pipe 46a above the cutoff valve and adapted to permit the flow of the detergent downwardly only in the supply-pipe. The check valve serves also to prevent water from passing upwardly in the detergent supply-pipe into the detergent supply-tank. In this manner, water in the system is prevented from diluting the supply of detergent.

Referring again to the cutoff valve 85, the latter is provided with an operating lever-arm 86 to which a spring 87 is attached as shown, to hold the operating-arm 86 normally in a downward position for maintaining the cutoff valve closed, which hereinafter is referred to as its "off" position and which is the position of the cutoff valve when the apparatus is being used to wash a vehicle, as hereinafter described. When it is desired to apply a soap solution to a vehicle, the operating lever-arm 86 of the cutoff valve is pulled upwardly into its uppermost or "on" position, as indicated by dotted lines in Fig. 10, whereupon the detergent in the supply-tank is permitted to flow down through the supply-pipe 46a to the aforementioned mono-flow valve 83. The movement of the lever-arm 86 of the cutoff valve into its "on" position is effected automatically by a chain connection with the operating handle 45a of the manually-operated three-way valve 44a, as and in the manner hereinafter described.

Referring again to the mono-flow valve 83, the latter has two substantially horizontally aligned ports identified as the inlet port 88 and the outlet port 89, the latter being connected to the adjacent inlet opening of the aforementioned T-fitting connecting the water supply-pipe 54a to the inlet end 53a of the pump 52a. The inlet port 88 of the mono-flow valve is provided with a reduction nipple to which is connected the lower end of a pipe or tubing 90 of relatively small diameter, sometimes hereinafter referred to as a restricted supply-pipe, for permitting a limited quantity of water to enter the inlet end of the mono-flow valve 83. The opposite or upper end of the restricted supply-pipe 90 is connected into the radial port of the three-way valve 44a opposite its connection to the water supply-pipe 54a.

Referring more particularly to Figs. 12 and 13, the manually-operated three-way valve 44a of the fluid supply-means is seen to comprise a casing having three radial ports. Respectively connected to the said ports are the aforementioned water-supply pipes 54a, 54b and the restricted water-supply pipe 90. The rotatable body of the valve has a connecting passage 92 therein so arranged that when the operating handle 45a of the valve is swung to the left of its central or "off" position as seen in Fig. 12, the water-supply pipe 54b will be connected by the adjacent connecting passage 92 of the valve-body with the water-supply pipe 54a for supplying water directly to the water-pump 52a. When the operating handle is swung to the right of its central or "off" position, connecting passage 92 connects the water-supply pipe 54b directly to the restricted water-supply pipe 90 for supplying water thereto. At the same time, the flow of water to the pipe 54a is cut off.

The central position of the operating handle 45a is its "off" position, at which time the water-supply pipes 54a and 90 respectively are cut off from the water-supply pipe 54b. It will be noted that in this position of the valve a bleed hole 94 in the body is in alignment with the water-supply pipe 54a, so that when the valve is in its "off" position any water under pressure in the supply-pipe 54a may escape therefrom by way of the bleed hole 94 for the purpose hereinafter described.

As mentioned above, the cut-off valve 85 in the detergent supply-pipe 46a is adapted to be actuated automatically by operation of the valve-operating handle 45a, and to this end the operating lever-arm 86 of the cut-off valve is connected by a chain 95 to a finger 45b which constitutes an extension of the operating handle 45a and which projects therefrom substantially axially thereof and on the opposite side of the handle fastening means 96 of the valve. The finger-portion 45b of the handle has the upper end of the aforesaid chain 95 secured thereto. Fastened to a suitable support such as, for example, the casing of the operating valve, or a part of the frame of the fluid-supply means, is a bracket 97 extending beneath the inwardly projecting finger-portion 45b of the operating handle and which has a vertical aperture therein through which the upper end of the chain 95 freely extends, the vertical aperture in the bracket 97 being transversely offset to the left (Fig. 14) of the operating handle finger 45b of the cut-off valve 85 when the operating handle is in its "off" position. In accordance with this construction, when the operating handle 45a is swung to the left which position corresponds to its washing position as seen in Figs. 11 and 13 the finger 45b of the operating handle will displace the upper end of the chain to the right with the result that the chain is slacked-off so that no upward pull is exerted on the chain. Hence, the cut-off valve remains in its normal closed position. However, when the operating handle is swung to the right, which position corresponds to its soaping position, then the finger portion 45b of the operating handle will swing to the left and pull the chain with it, thereby pulling the operating lever-arm 86 upwardly to open the cut-off valve and permit detergent in the detergent supply-tank to flow down through the supply-pipe 46a to the mono-flow valve 83 and from thence by way of the pump to the flexible tubing 40 connected to the pipeline-frame.

The operation of the modified fluid-supply means is as follows. Let it be assumed that the detergent supply-tank 80 has been filled or partially filled with a soap solution or other detergent, that the water-supply pipe 54b is connected to a water supply such as, for example, a water pipe connected to the street main, and that the flexible tubing 40 is connected to the pipeline-frame of the vehicle-washing apparatus. Let it further be assumed, that the operating handle 45a is in its "off" position as shown in Fig. 11. Then by closing the double-pole double-throw switch such as 70 in the form of the invention previously described, the water-pump motor 56a and the motor 24 of the reel mechanism will be energized to cause the pipeline-frame to be lowered and raised relative to a vehicle to be washed. Should it be desired to initially soap down a vehicle, then the operating handle 45a of the three-way valve is swung into soaping position as indicated in Fig. 11, whereupon water from the water pipe 54b is by-passed by the valve into the restricted water supply-pipe 90, through which it flows to the mono-flow valve 83 and from thence to the pump 52a which propels the water under relatively high pressure to the pipeline-frame by way of the flexible tube 40.

In passing through the Venturi passage 83a of the mono-flow valve 83, a partial vacuum is created therein opposite the lower end of the detergent supply-pipe 46a. Moreover, since the cut-off valve 85 has opened automatically upon swinging the operating handle 45a into its soaping position, the soap is drawn out of the soap-supply chamber 80 through the restricted aperture 82 in the bottom thereof by the partial vacuum in the mono-flow valve, the soap passing down into the mono-flow valve and there mixing with the limited amount of water passing therethrough, whereby a mixture of soap and water is delivered by the water pump 52a to the pipeline-frame for soaping down a vehicle. In this connection, it should be pointed out that by providing a restricted aperture 82 in the bottom of the soap tank, a measured quantity of soap will be withdrawn therefrom for a given vacuum. In this manner, the amount of soap used may be conserved.

After the pipeline-frame has moved downwardly over the vehicle and has automatically returned to its initital position in the manner hereabove described, both the water-pump motor and the reel-motor will be automatically de-energized. Then when the operator swings the operating handle 45a back to its "off" position, the chain 95 will be slacked off, whereupon the spring 87 will automatically pull the lever-arm 86 of the cut-off valve down to shut off the latter. Also, water under pressure in the pipeline-frame and in the water-supply pipes connected thereto, will be released by way of the bleed-hole 94 of the valve thereby preventing water in the pipeline-frame from constantly dripping on-to the floor or onto the heads of the attendants.

Having soaped down a car, the operator may then throw the double-pole double-throw switch 70 in the opposite direction to again start the motors of the pipeline-frame and pump. Upon turning the operating handle 45a into its washing position as shown in Figs. 11 and 12, the body of the valve will be turned so that the water-supply pipe 54b is connected directly with the water inlet pipe 54a for feeding water directly to the water pump. At the same time that the operating handle 45a is turned into its washing position, the restricted water pipe 90 will be cut off from the water-supply pipe 54b. Moreover, since the chain 95 is not actuated, the cut-off valve 85 will remain in its closed position. Consequently, only water is delivered to the pump which, in turn, delivers the water under pressure to the pipeline-frame for washing down the vehicle. Since the restricted water-supply pipe 90 is by-passed, the quantity of water delivered per unit of time to the frame for washing is greater than the quantity of water delivered when soaping down a vehicle.

The fluid-supply means of Figs. 10 to 14 is thus an inexpensive convenient and easily operated means for introducing soap into the vehicle-washing apparatus, and at the same time provides visual inspection of the soap supply, facilitates replenishment of the soap, and minimizes the corrosive effects of the latter.

From the foregoing description, it will be evident that the improved automatic vehicle-washing apparatus of this invention is a relatively inexpensive and durable construction, requires no complicated tracks, rails or skeleton framework for installation, and occupies substantially no space on the floor of the garage or service station in which it is installed, the apparatus being operable, moreover, substantially automatically and with facility and dispatch to effectively clean all surfaces of a vehicle. Although the embodiment of the invention shown herein is highly successful, it will be understood that it is within the purview of the invention to include all modifications and alterations of the structure shown within the scope of the appended claims.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. In apparatus for washing vehicles, the combination of: overhead supporting-means; spraying-means formed to extend around a portion of a vehicle to be washed, said spraying-means comprising a conduit forming a substantially closed circuit and having a plurality of spray-nozzles and an inlet-port; reel mechanism for suspending said spraying-means from said overhead supporting-means; means to secure said reel mechanism to said overhead-supporting means, said reel mechanism being arranged to raise and lower said spraying-means relative to said vehicle; fluid-supply means connected to the inlet-port of said spraying-means and arranged to supply fluid to the spray-nozzles thereof for washing said vehicle; operating-means arranged to actuate said reel mechanism; and control-means rendering said operating-means inoperative in timed relation with the movement of said spraying-means through a last part of its motion into uppermost position.

2. In apparatus for washing vehicles, the combination of: overhead supporting-means; spraying-means formed to extend around a portion of a vehicle to be washed, said spraying-means comprising a conduit forming a substantially closed circuit and having a plurality of spray-nozzles and an inlet-port; reel mechanism for suspending said spraying-means from said overhead supporting-means; means to secure said reel mechanism to said overhead supporting-means, said reel mechanism being arranged to raise and lower said spraying-means relative to said vehicle; fluid-supply means connected to the inlet-port of said spraying-means and arranged to supply fluid to the spray-nozzles thereof for washing said vehicle; electrically energized operating-means arranged to actuate said reel mechanism; and control means including switch-means arranged to deenergize said electrically energized operating-means in timed relation with the movement of said spraying-means through a last part of its motion into uppermost position.

3. In apparatus for washing vehicles, the combination of: overhead supporting-means; spraying-means formed to extend around a portion of a vehicle to be washed, said spraying-means comprising a conduit forming a substantially closed circuit and having a plurality of spray-nozzles and an inlet-port; reel mechanism for suspending said spraying-means from said overhead supporting-means; means to secure said suspension-means to said overhead supporting-means, said suspension-means being arranged to raise and lower said spraying-means relative to said vehicle; fluid-supply means connected to the inlet-port of said spraying-means and arranged to supply fluid to the spray-nozzles thereof for washing said vehicle; operating-means including a reversible motor arranged to actuate said reel mechanism; and control-means including switch-means connected to said reversible motor, said switch-means being arranged to be actuated by the operation of said reel mechanism to automatically shut off said reversible motor when said spraying-means arrives in its uppermost position.

4. In apparatus for washing vehicles, the combination of: overhead supporting-means; spraying-means formed to extend around a portion of a vehicle to be washed, said spraying-means comprising a conduit forming a substantially closed circuit and having a plurality of spray-nozzles and an inlet-port; reel mechanism for suspending said spraying-means from said overhead supporting-means; means to secure said reel mechanism to said overhead supporting-means, said reel mechanism being arranged to raise and lower said spraying-means relative to said vehicle; fluid-supply means connected to the inlet-port of said spraying-means and arranged to supply fluid to the spray-nozzles thereof for washing said vehicle; electrically energized operating-means including a reversible motor arranged to drive said reel mechanism; and control-means comprising two switches and a switch-actuating finger, said switch-actuating finger being arranged to be moved to and fro between said switches by the operation of said reel mechanism to alternately engage and actuate said switches and shut off said reversible motor when said spraying-means completes its washing cycle.

5. In apparatus for washing vehicles, the combination of: overhead supporting-means; spraying-means formed to extend around a portion of a vehicle to be washed, said spraying-means comprising a conduit forming a substantially closed circuit and having a plurality of spray-nozzles and an inlet-port; reel mechanism for suspending said spraying-means from said overhead supporting-means; means to secure said reel mechanism to said overhead supporting-means, said reel mechanism being arranged to raise and lower said spraying-means relative to said vehicle; fluid-supply means connected to the inlet-port of said spraying-means and arranged to supply fluid to the spray-nozzles thereof for washing said vehicle; reversible operating-means arranged to actuate said reel mechanism; and control-means arranged to automatically shut off said reversible operating-means, said control-means including manually-operated means arranged to reverse the operation of said reversible operating-means.

6. In apparatus for washing vehicles, the combination of: overhead supporting-means; spraying-means formed to extend around a portion of a vehicle to be washed, said spraying-means comprising a conduit forming a substantially closed circuit and having a plurality of spray-nozzles and an inlet-port; reel mechanism for suspending said spraying-means from said overhead supporting-means; means to secure said reel mechanism to said overhead supporting-means, said reel mechanism being arranged to raise and lower said spraying-means relative to said vehicle; fluid-supply means connected to the inlet-port of said spraying-means and arranged to supply fluid to the spray-nozzles thereof for washing said vehicle; a reversible motor arranged to drive said reel mechanism; and control-means connected to said reversible motor and including a manually-operated switch for reversing said motor, and two snap-switches, and a snap-switch actuating-finger, said switch-actuating finger being arranged to be moved to and fro between said snap-switches by the operation of said reel mechanism to alternately engage and actuate said snap-switches and shut off said motor when said spraying-means completes its washing cycle.

7. In apparatus for washing vehicles, the combination of: overhead supporting-means; spraying-means formed to extend around a portion of a vehicle to be washed, said spraying-means comprising a conduit forming a substantially closed circuit and having a plurality of spray-nozzles and an inlet-port; reel mechanism for suspending said spraying-means from said overhead supporting-means; means to secure said reel mechanism to said overhead supporting-means, said reel mechanism being arranged to raise and lower said spraying-means relative to said vehicle; fluid-supply means connected to the inlet-port of said spraying-means and arranged to supply fluid to the spray-nozzles thereof for washing said vehicle; operating-means arranged to actuate said reel mechanism; and control-means connected to said operating-means and to said fluid-supply means to shut off said operating-means and said fluid-supply means substantially simultaneously in timed relation with the movement of said spraying-means through a last part of its motion into uppermost position.

8. In apparatus for washing vehicles, the combination of: overhead supporting means; spraying-means formed to extend around a portion of a vehicle to be washed, said spraying-means comprising a conduit forming a substantially closed circuit and having a plurality of spray-nozzles and an inlet-port; reel mechanism for suspending said spraying-means from said overhead supporting means; means to secure said reel mechanism to said overhead supporting-means, said reel mechanism being arranged to raise and lower said spraying-means relative to said vehicle; fluid-supply means connected to the inlet-port of said spraying-means and arranged to supply fluid to the spray-nozzles thereof for washing said vehicle; a reversible motor arranged to drive said reel mechanism; and control-means connected to said reversible motor and said fluid-supply means and including a manually-operated switch, a pair of snap-switches, and a snap-switch actuating-finger, said snap-switch actuating-finger being arranged to be moved to and fro between said snap-switches by the operation of said reel mechanism to alternately engage and actuate said snap-switches and automatically shut off said motor and said fluid-supply means when said spraying-means completes its washing cycle, said manually-operated switch being arranged to start said motor and said fluid-supply means after completion of each washing cycle.

9. In apparatus for washing vehicles, the combination of: overhead supporting-means; a frame formed to extend around a portion of a vehicle to be washed, said frame comprising a conduit forming a substantially closed circuit and having a plurality of spray-nozzles and an inlet-port; reel mechanism for suspending said frame from said overhead supporting-means and comprising a reel having a pair of spools, each spool having a pair of crank arms arranged at an angle of substantially 180° to each other, and each crank arm being provided at its outer end with a pivoted reversing-link, and flexible cords connected to said links, respectively, of said reels and to said frame; means arranged to secure said reel mechanism to said overhead supporting-means; operating-means arranged to rotate said reel and spools in one direction, said crank arms of said uni-directionally rotating spools serving successively to unwind said flexible cords from and wind them on spools for lowering and raising said frame relative to said vehicle; fluid-supply means connected to the inlet-port of said frame and arranged to supply fluid to the spray-nozzles thereof for washing said vehicle; and control-means connected to said operating-means and said fluid-supply means to start and stop said operating-means and said fluid-supply means subtantially simultaneously.

10. Apparatus for washing vehicles, comprising a conduit formed to substantially encircle a vehicle and having an inlet and a multiplicity of longitudinally spaced spray nozzles directed into the encircling confines of said conduit; an overhead suspension for said conduit, said suspenion being operable to lower said conduit from and raise it into a home position above a vehicle on the floor, once for each cycle performance of said conduit during which the vehicle is adapted to be sprayed progressively at different levels first downwardly and then upwardly; power means for operating said suspension; control means for rendering said power means operative for cycle performance of said conduit; and means for conducting a liquid under pressure to the inlet of said conduit during a cycle performance of the latter.

11. Apparatus for washing vehicles, comprising a conduit formed to substantially encircle a vehicle having an inlet and a multiplicity of longitudinally spaced spray nozzles directed into the encircling confines of said conduit; a rotary overhead reel having a plurality of spaced crank arms of larger radii than said reel; a plurality of flexible cords connected with their ends to said conduit and crank arms, respectively, for suspending said conduit in substantially horizontal disposition from said reel, said crank arms being angularly disposed relative to each other so that said cords will successively be unwound from and wound on said reel during a cycle of uni-directional rotation of the latter in either direction to lower said conduit through a predetermined distance from and raise it into a home position above a vehicle on the floor while retaining said conduit in its substantially horizontal disposition; power means for turning said reel in either direction; and means for conducting a liquid under pressure to the inlet of said conduit.

12. Apparatus for washing vehicles, comprising a conduit formed to substantially encircle a vehicle and having an inlet and a multiplicity of longitudinally spaced spray nozzles directed into the encircling confines of said conduit; a rotary overhead reel; a threaded spindle rotating with said reel; a plurality of flexible cords connected with their ends to said reel and conduit, respectively, for suspending said conduit in substantially horizontal disposition from said reel, said cords being so connected with said reel that they will successively be unwound from and wound on said reel during a cycle of uni-directional rotation of the latter in either direction to lower said conduit through a predetermined distance from and raise it into a home position above a vehicle on the floor while retaining said conduit in its substantially horizontal disposition; a reversible motor for turning said reel in either direction; spaced switches each being operative to stop said motor; a non-rotatable nut on said threaded spindle operating said switches, respectively, at the ends of cycles of rotation of said reel in opposite directions, respectively; and means for conducting a liquid under pressure to the inlet of said conduit.

13. In apparatus for washing vehicles, the combination of a conduit formed to substantially encircle a vehicle and having an inlet and a multiplicity of longitudinally spaced spray nozzles directed into the encircling confines of said conduit; a rotary overhead reel having a plurality of spaced crank arms of larger radii than said reel; a plurality of flexible cords connected with their ends to said conduit and crank arms, respectively, for suspending said conduit in substantially horizontal disposition from said reel, said crank arms being angularly disposed relative to each other so that they will, on rotation of said reel, completely unwind said cords from said reel and rewind them thereon during a last part and a like initial part of the movement of said conduit into and from its lowermost position, respectively; means for conducting a liquid under pressure to the inlet of said conduit; and means for turning said reel to cause movement of said conduit between its uppermost and lowermost positions during which a vehicle on the floor is adapted to be sprayed progressively at different levels.

References Cited in the file of this patent

UNITED STATES PATENTS

| Number | Name | Date |
|---|---|---|
| Re. 23,294 | Hopper et al. | Nov. 21, 1950 |
| 1,137,626 | Jackson | Apr. 27, 1915 |
| 1,508,495 | Bacharach | Sept. 16, 1924 |
| 1,777,152 | Poteet | Sept. 30, 1930 |
| 2,158,914 | Rinehart | May 16, 1939 |
| 2,233,965 | Strovink | Mar. 4, 1941 |
| 2,536,843 | Dye | Jan. 2, 1951 |

FOREIGN PATENTS

| Number | Country | Date |
|---|---|---|
| 274,546 | Great Britain | July 15, 1927 |
| 289,652 | Great Britain | May 3, 1928 |